United States Patent
Varnhorn et al.

(10) Patent No.: US 6,802,309 B2
(45) Date of Patent: Oct. 12, 2004

(54) GAS COOKER

(75) Inventors: Günter Varnhorn, Cremlingen (DE); Joachim Grützke, Zaberfeld-Leonbronn (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 62 days.

(21) Appl. No.: 10/158,732

(22) Filed: May 30, 2002

(65) Prior Publication Data

US 2003/0041740 A1 Mar. 6, 2003

Related U.S. Application Data

(63) Continuation of application No. PCT/EP00/10233, filed on Oct. 17, 2000.

(30) Foreign Application Priority Data

Nov. 30, 1999 (DE) .......................................... 199 57 722

(51) Int. Cl.[7] .............................................. F24C 15/10
(52) U.S. Cl. .................................. 126/215; 126/214 R
(58) Field of Search ........................ 126/214 R–214 C; 248/683, 537, 206.5, 309.4

(56) References Cited

U.S. PATENT DOCUMENTS

| 3,651,796 | A |   | 3/1972 | Nelson |        |
|-----------|---|---|--------|--------|--------|
| 4,638,786 | A | * | 1/1987 | Lucky  | 126/24 |
| 4,830,602 | A |   | 5/1989 | Kaselow |       |

FOREIGN PATENT DOCUMENTS

| DE | 1 867 154    |    | 2/1963 |            |
|----|--------------|----|--------|------------|
| DE | 7 020 430    |    | 9/1970 |            |
| DE | 2739743 A1   | *  | 3/1979 | F24C/15/10 |
| DE | 2740542 A1   | *  | 3/1979 | F24C/15/10 |
| DE | 37 32 271 A1 |    | 3/1988 |            |
| DE | 195 05 470 A1|    | 8/1996 |            |
| DE | 297 03 237 U1|    | 6/1997 |            |
| DE | 19934741 A1  | *  | 1/2001 | F24C/15/10 |
| FR | 2 617 948    |    | 1/1989 |            |
| FR | 2617948 A1   | *  | 1/1989 | F24C/3/12  |
| GB | 2 171 591 A  |    | 9/1986 |            |

* cited by examiner

*Primary Examiner*—Ira S. Lazarus
*Assistant Examiner*—James G. Barrow
(74) *Attorney, Agent, or Firm*—Laurence A. Greenberg; Werner H. Stemer; Ralph E. Locher

(57) ABSTRACT

A gas cooker includes a pot support that can be fixed on a top panel, preferably a cooktop panel, by a permanent-magnet configuration. The permanent-magnet configuration has magnet parts disposed at connecting locations on a pot support and on the top panel, and the magnet parts are located opposite one another. At least one of the magnet parts is a permanent magnet and another of the magnet parts is either a material magnetically attracted by the permanent magnet or a further permanent magnet having a polarity opposite the permanent magnet and magnetically attracted by the permanent magnet. As such, the configuration magnetically retains the pot support in a predetermined position on the top panel.

26 Claims, 3 Drawing Sheets

GAS COOKER

CROSS-REFERENCE TO RELATED APPLICATION

This application is a continuation of copending International Application No. PCT/EP00/10233, filed Oct. 17, 2000, which designated the United States and was not published in English.

BACKGROUND OF THE INVENTION

Field of the Invention

The invention relates to a gas cooker containing at least one gas burner and a pot support that is associated with the gas burner and is disposed on a top panel.

German Published, Non-Prosecuted Patent Application DE 3732271, corresponding to U.S. Pat. No. 4,830,602 to Kaselow, discloses a generic gas cooker. The Kaselow gas cooker has at least one gas burner with an associated pot support disposed on a top panel.

According to German Utility Model DE 29703237 U1, a pot support is magnetically connected to a magnetizable top panel.

SUMMARY OF THE INVENTION

It is accordingly an object of the invention to provide a gas cooker that overcomes the hereinbefore-mentioned disadvantages of the heretofore-known devices of this general type and makes possible for a pot support to be fastened releasably, in a straightforward and inexpensive manner, on a gas cooker. The invention also makes it possible for the fastening to be such that the pot support, rather than having to be fastened on the top or bottom of the burner, can be fixed releasably on a top panel, e.g., a gas cooktop or a cooktop panel, for example, on a glass-ceramic panel or some other panel that is of non-magnetic material and forms a cooktop. The intention is for the device to be inexpensive and to allow the top panel and the pot support to be easily cleaned.

With the foregoing and other objects in view, there is provided, in accordance with the invention, a gas cooker including a top panel, at least one gas burner disposed at the top panel, the burner having a vertical center axis, a pot support associated with the gas burner and disposed on the top panel for supporting a cooking container at the gas burner, a permanent-magnet configuration having at least two permanent-magnet connecting locations distributed about the axis, magnet parts disposed at each of the connecting locations on the pot support and on the top panel, and the magnet parts of the pot support and the top panel located opposite one another, at least one of the magnet parts being a permanent magnet with a given polarity, another of the magnet parts being one of a material magnetically attracted by the permanent magnet and a further permanent magnet having a polarity opposite the given polarity and magnetically attracted by the permanent magnet, and the permanent-magnet configuration magnetically retaining the pot support in a predetermined position on the top panel with respect to the gas burner.

According to the invention, the permanent-magnet configuration has at least two permanent-magnet connecting locations, which are distributed around the vertical center axis of the gas burner and have in each case one magnet part disposed on the pot support and on a top part of the cooker. The magnet parts are disposed opposite one another. At least one magnet part is a permanent magnet and the associated other magnet part is either a magnetic material that can be attracted magnetically by the permanent magnet or is a further permanent magnet, with opposite polarity, which can be attracted magnetically by the permanent magnet.

The invention has the advantage that the pot support can be fastened, and released again, easily and quickly without any holes, screws, rivets, or similar fastening device. Such a configuration has the further advantage that the pot support can be cleaned separately from the top panel and separately from the gas burner. The pot support is thermally isolated from the gas burner. The operations of placing the pot support in position and removing the same are extremely straightforward.

In accordance with another feature of the invention, the pot support preferably has a base body made of non-magnetic, non-magnetizable material, on which the magnet parts are fastened.

In accordance with a further feature of the invention, the base body preferably has downwardly projecting legs, of which there are preferably three, at the bottom ends of which are disposed the magnet parts.

In accordance with an added feature of the invention, the top panel preferably is of heat-resistant, non-magnetic, non-magnetizable material. It is preferably a glass-ceramic panel. It is possible for the top panel to form a closed covering over a gas burner or to be provided with an opening, into or through which the gas flames or the gas-burner head project.

In accordance with an additional feature of the invention, the burner is disposed beneath the top panel and the top panel is a heat-resistant panel of a non-magnetic, non-magnetizable material and extends in a closed state over the burner to form a cooktop.

In accordance with yet another feature of the invention, the top panel has markings for positioning the pot support.

In accordance with yet a further feature of the invention, the top panel has an opening disposed at the burner for projecting burner flames through the opening.

In accordance with yet an added feature of the invention, the opening is centered on the axis.

In accordance with yet an additional feature of the invention, the permanent-magnet configuration magnetically retains the pot support centered on the axis.

In accordance with again another feature of the invention, the connecting locations are evenly distributed about the axis.

With the objects of the invention in view, there is also provided a gas cooker, including a top panel having a first set of magnet parts, at least one gas burner disposed at the top panel, a pot support having a second set of magnet parts and being disposed on the top panel for supporting a cooking container at the gas burner, one of the first and second sets of magnet parts being a permanent magnet with a given polarity, another of the first and second sets of magnet parts being one of a material to be magnetically coupled to the permanent magnet and a further permanent magnet having a polarity opposite the given polarity and to be magnetically coupled with the permanent magnet, and the first and second sets of magnet parts magnetically retaining the pot support in a predetermined position on the top panel by placing the second set of magnet parts substantially opposite the first set of magnet parts.

Other features that are considered as characteristic for the invention are set forth in the appended claims.

Although the invention is illustrated and described herein as embodied in a gas cooker, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
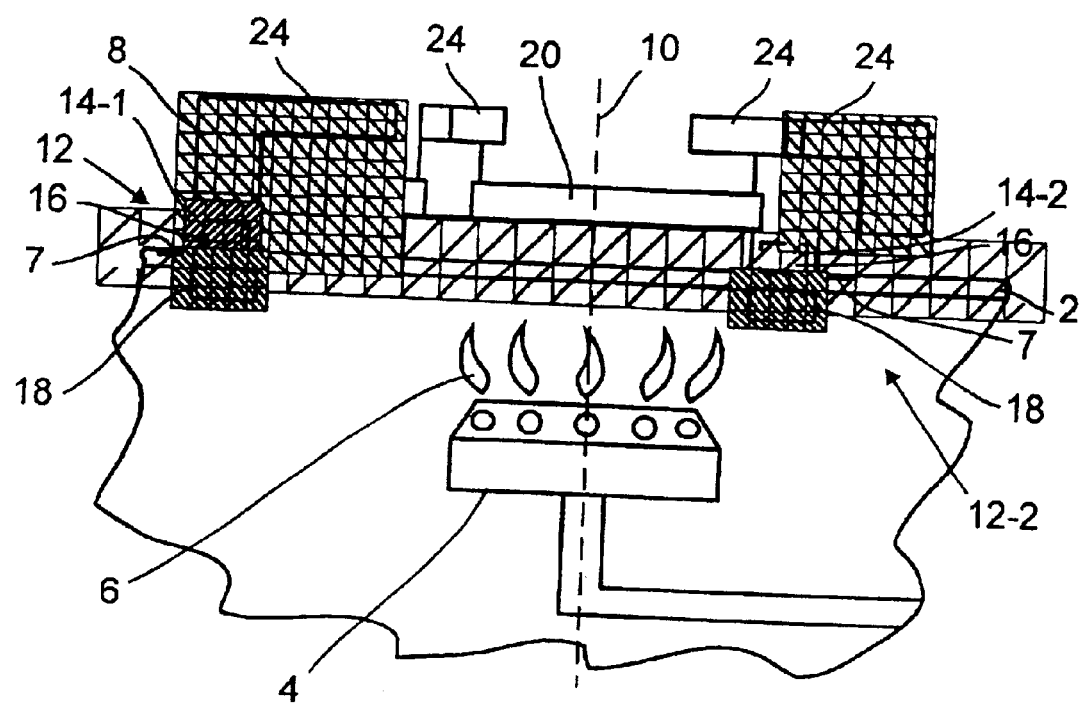
FIG. 1 is a diagrammatic, fragmentary, cross-sectional view through part of a gas cooker with a pot support according to the invention, as seen along the plane I—I in FIG. 2.
Figure 2:
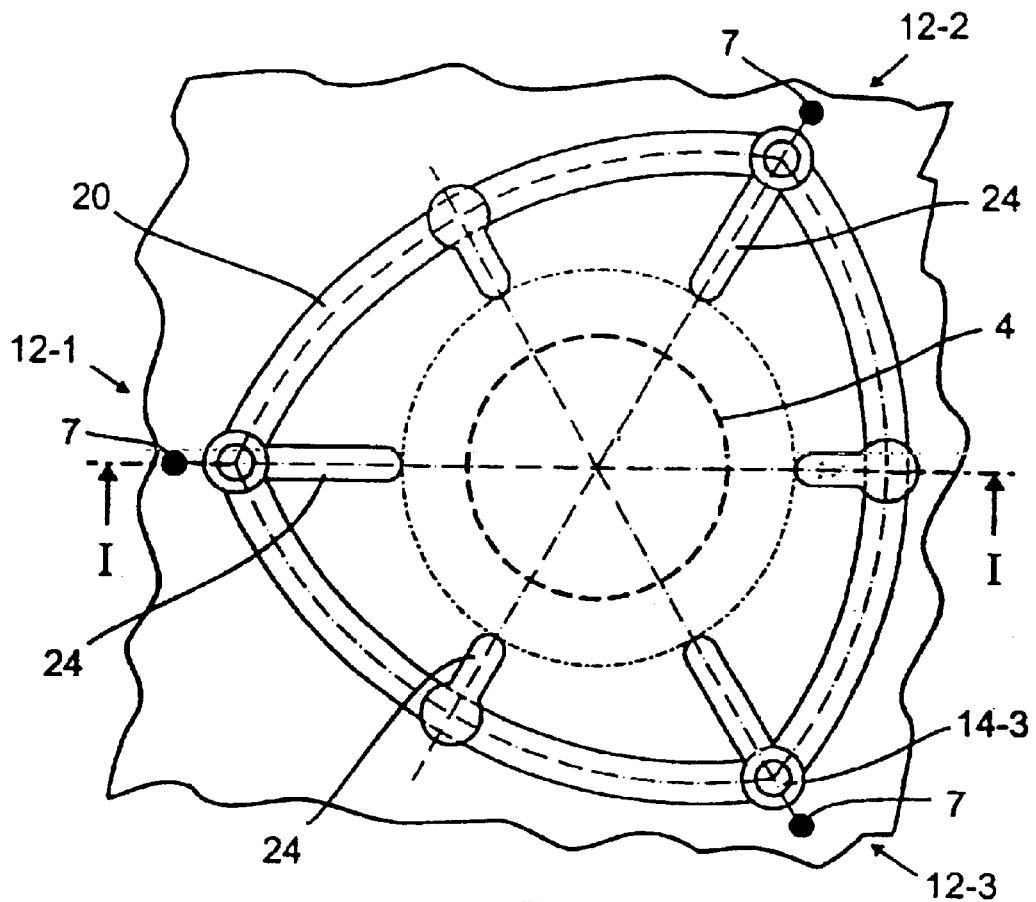
FIG. 2 is a fragmentary plan view of the gas cooker and the pot support of FIG. 1.

Referring now to the figures of the drawings in detail and first, particularly to FIG. 1 thereof, there is shown a gas cooker having a heat-resistant cooktop panel 2, which may be a gas cooktop or is preferably a cooktop panel, preferably made of glass-ceramic material, which forms a cooktop that has at least one cooking area, and preferably a plurality of cooking areas. A gas burner 4 is located beneath each cooking area. The cooktop panel 2 forms a surface that is closed even over each gas burner 4.

Each cooking area respectively contains one or more visible markings 7 for positioning a pot support 8 over a gas burner 4.

The pot support 8 is fixed and/or secured on the cooktop panel 2, by way of a permanent-magnet configuration 12 (12-1, 12-2, 12-3), in the position relative to the gas burner 4 that is determined by the markings 7 and can be removed manually from the cooktop panel, counter to the magnetic retaining force, for cleaning purposes.

If the permanent-magnet configuration 12 has at least two permanent-magnet connecting locations 12-1, 12-2, and 12-3 distributed around the vertical center axis 10 of the gas burner 4, then the pot support 8 is fixed on the cooktop panel 2 in each transverse direction.

In the case of the preferred embodiment illustrated in the drawings, the pot support 8 has three legs 14-1, 14-2, and 14-3, in the bottoms of which one permanent magnet 16 is inserted respectively and fastened. The legs 14-1, 14-2, and 14-3 are disposed at intervals from one another around the center axis 10 of the gas burner 4.

At the same intervals, and at the same distances from the center axis 10 of the gas burner 4, permanent magnets 18 with opposite polarity are fastened on the underside of the cooktop panel 2. As a result, they attract the magnets 16 of the pot support 8 and retain the same in the position that is defined by the permanent magnets 18 of the cooktop panel 2.

The pot support 8 has a single-piece base body 20 made of non-magnetizable material that is heat-resistant, for example, a metal casting.

In each case, one permanent magnet 18 of the cooktop panel 2 and one adjacent permanent magnet 16 of the pot support 8, together, form a permanent-magnet connecting location 12-1, 12-2, 12-3.

Instead of two permanent magnets 16, 18, it is possible to provide, at each permanent-magnet connecting location, just one permanent magnet and a metal element (iron) that can be attracted magnetically by the same.

Figure 4:
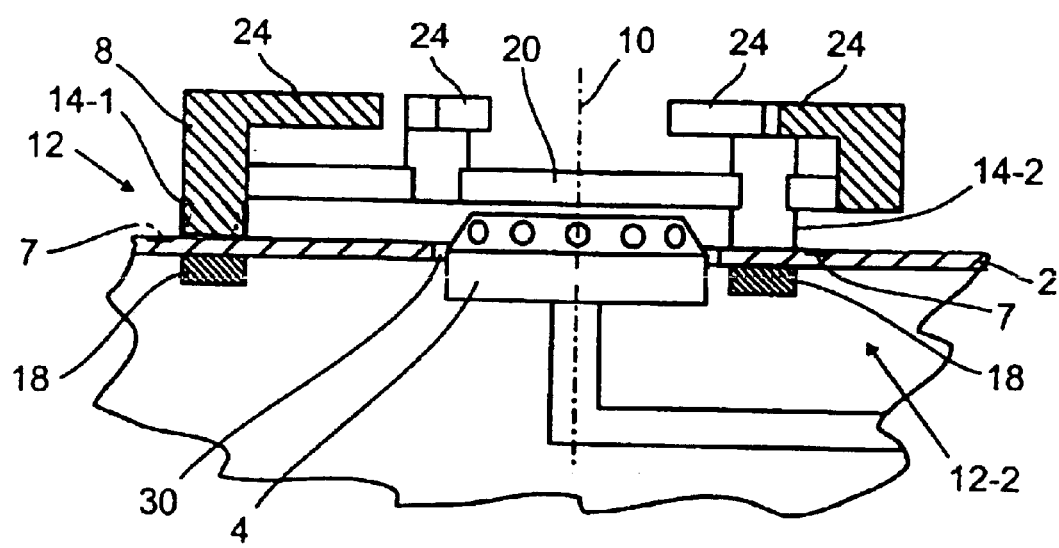
FIG. 4 is a diagrammatic. fragmentary, cross-sectional view of yet another embodiment of the cooker of FIG. 1.

According to another embodiment (shown in FIG. 4), the entire pot support 8 may be of magnetizable iron, of which the legs 14-1, 14-2, 14-3 can be attracted magnetically by the permanent magnets 18 of the cooktop panel 2.

At its top end, the pot support has at least three supporting surfaces 24, on which it is possible to position a cooking utensil (pot, pan, plate).

Figure 3:
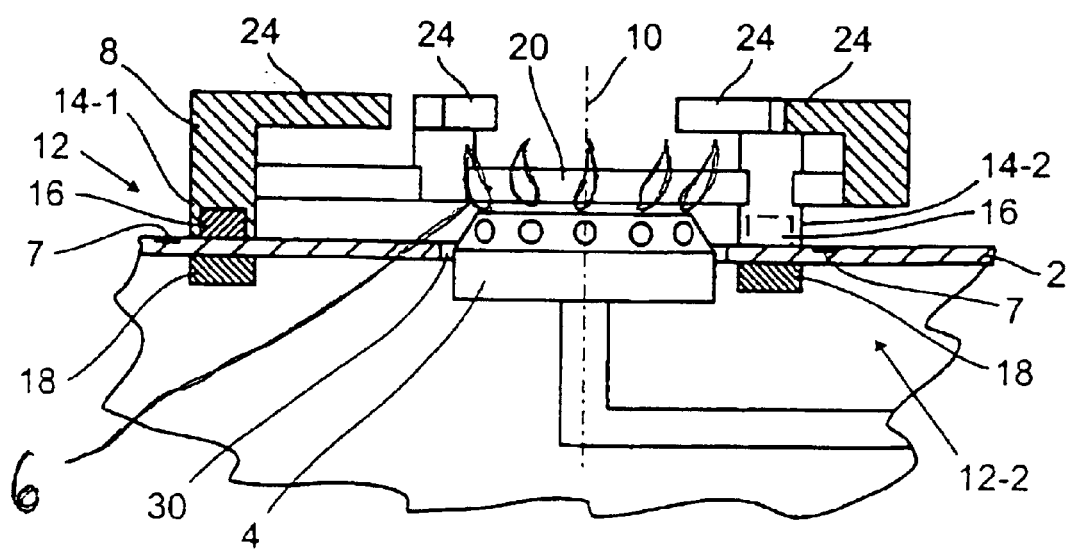
FIG. 3 is a diagrammatic, fragmentary, cross-sectional view of another embodiment of the cooker of FIG. 1.

According to the embodiment of FIG. 3, an opening 30 is located in the top panel 2. It is, therefore, possible for the gas flames 6 or the gas burner 4 to project into or through the opening 30.

We claim:

1. A gas cooker, comprising:

a top panel;

at least one gas burner disposed at said top panel, said burner having a vertical center axis;

a pot support associated with said gas burner and disposed on said top panel for supporting a cooking container at said gas burner;

a permanent-magnet configuration having:

at least two permanent-magnet connecting locations distributed about said axis;

magnet parts disposed at each of said connecting locations on said pot support and on said top panel; and said magnet parts of said pot support and said top panel located opposite one another;

at least one of said magnet parts being a permanent magnet with a given polarity;

another of said magnet parts being one of:

a material magnetically attracted by said permanent magnet; and a further permanent magnet having a polarity opposite said given polarity and magnetically attracted by said permanent magnet; and said permanent-magnet configuration magnetically retaining said pot support in a predetermined position on said top panel with respect to said gas burner.

2. The gas cooker according to claim 1, wherein:

said pot support has a base body of a non-magnetic, non-magnetizable material; and said magnet parts of said pot support are fastened to said base body.

3. The gas cooker according to claim 1, wherein:

said pot support has at least three downwardly projecting legs with bottom ends; and said magnet parts of said pot support are disposed on at least two of said bottom ends.

4. The gas cooker according to claim 2, wherein:

said pot support has at least three downwardly projecting legs with bottom ends; and said magnet parts of said pot support are disposed on at least two of said bottom ends.

5. The gas cooker according to claim 1, wherein:

said burner is disposed beneath said top panel; and said top panel is a heat-resistant panel of a non-magnetic, non-magnetizable material and extends in a closed state over said burner to form a cooktop.

6. The gas cooker according to claim 5, wherein said panel is a glass-ceramic panel.

7. The gas cooker according to claim 1, wherein:

said burner is disposed beneath said top panel;

said top panel is a heat-resistant panel of a non-magnetic, non-magnetizable material; and said top panel is closed over said burner to form a cooktop.

8. The gas cooker according to claim 7, wherein said panel is a glass-ceramic panel.

9. The gas cooker according to claim 1, wherein said top panel is a glass-ceramic panel.

10. The gas cooker according to claim 1, wherein said top panel has markings for positioning said pot support.

11. The gas cooker according to claim 1, wherein said top panel has an opening disposed at said burner for projecting burner flames through said opening.

12. The gas cooker according to claim 11, wherein said opening is centered on said axis.

13. The gas cooker according to claim 12, wherein said permanent-magnet configuration magnetically retains said pot support centered on said axis.

14. The gas cooker according to claim 1, wherein said connecting locations are evenly distributed about said axis.

15. A gas cooker, comprising:

a top panel having a first set of magnet parts;

at least one gas burner disposed at said top panel;

a pot support:

having a second set of magnet parts; and being disposed on said top panel for supporting a cooking container at said gas burner;

one of said first and second sets of magnet parts being a permanent magnet with a given polarity;

another of said first and second sets of magnet parts being one of:

a material to be magnetically coupled to said permanent magnet; and a further permanent magnet having a polarity opposite said given polarity and to be magnetically coupled with said permanent magnet; and said first and second sets of magnet parts magnetically retaining said pot support in a predetermined position on said top panel by placing said second set of magnet parts substantially opposite said first set of magnet parts.

16. The gas cooker according to claim 15, wherein:

said pot support has a base body of a non-magnetic, non-magnetizable material; and said second set of magnet parts are fastened to said base body.

17. The gas cooker according to claim 15, wherein:

said pot support has at least three downwardly projecting legs with bottom ends; and said second set of magnet parts are disposed on at least two of said bottom ends.

18. The gas cooker according to claim 15, wherein said top panel is a glass-ceramic panel.

19. The gas cooker according to claim 15, wherein:

said burner is disposed beneath said top panel;

said top panel is a heat-resistant panel of a non-magnetic, non-magnetizable material; and said top panel is closed over said burner to form a cooktop.

20. The gas cooker according to claim 19, wherein said panel is a glass-ceramic panel.

21. The gas cooker according to claim 15, wherein said top panel has markings for positioning said pot support.

22. The gas cooker according to claim 15, wherein said top panel has an opening disposed at said burner for projecting burner flames through said opening.

23. The gas cooker according to claim 22, wherein:

said burner has a vertical center axis; and said opening is centered on said axis.

24. The gas cooker according to claim 23, wherein said first and second sets of magnet parts magnetically retain said pot support centered on said axis.

25. The gas cooker according to claim 17, wherein:

said first set of magnet parts is three magnet parts;

said second set of magnet parts is three magnet parts; and said second set of magnet parts are each disposed on one bottom end of said legs.

26. In a gas cooktop having a top panel and at least one gas burner disposed at the top panel, a pot support retaining configuration comprising:

a first set of magnet parts attached to the top panel;

a pot support:

having a second set of magnet parts; and being disposed on the top panel for supporting a cooking container at the gas burner;

one of said first and second sets of magnet parts being a permanent magnet with a given polarity;

another of said first and second sets of magnet parts being one of:

a material to be magnetically coupled to said permanent magnet; and a further permanent magnet having a polarity opposite said given polarity and to be magnetically coupled with said permanent magnet; and said first and second sets of magnet parts magnetically retaining said pot support in a predetermined position on the top panel by placing said second set of magnet parts substantially opposite said first set of magnet parts.

* * * * *